United States Patent
Kim et al.

(10) Patent No.: US 11,787,933 B2
(45) Date of Patent: Oct. 17, 2023

(54) THERMOPLASTIC POLYCARBONATE RESIN COMPOSITION AND MOLDED ARTICLE FORMED THEREFROM

(71) Applicant: LOTTE CHEMICAL CORPORATION, Seoul (KR)

(72) Inventors: Nam Hyun Kim, Uiwang-si (KR); Bong Jae Lee, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 198 days.

(21) Appl. No.: 17/298,781

(22) PCT Filed: Mar. 11, 2020

(86) PCT No.: PCT/KR2020/003403
§ 371 (c)(1),
(2) Date: Jun. 1, 2021

(87) PCT Pub. No.: WO2020/197132
PCT Pub. Date: Oct. 1, 2020

(65) Prior Publication Data
US 2022/0033650 A1    Feb. 3, 2022

(30) Foreign Application Priority Data

Mar. 28, 2019 (KR) .......................... 10-2019-0035582

(51) Int. Cl.
| | |
|---|---|
| *C08L 69/00* | (2006.01) |
| *C08L 23/12* | (2006.01) |
| *C08K 7/14* | (2006.01) |
| *C08L 23/08* | (2006.01) |
| *C08L 23/26* | (2006.01) |

(52) U.S. Cl.
CPC ............... *C08L 69/00* (2013.01); *C08K 7/14* (2013.01); *C08L 23/0884* (2013.01); *C08L 23/26* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 5,594,062 | A | 1/1997 | Takemura et al. |
| 5,847,041 | A | 12/1998 | Takemura et al. |
| 2012/0108729 | A1 | 5/2012 | Lyons et al. |
| 2014/0231701 | A1 | 8/2014 | Shin et al. |
| 2014/0256848 | A1 | 9/2014 | Lyongs et al. |
| 2015/0353732 | A1* | 12/2015 | Wang ...................... C08L 67/02 524/588 |
| 2017/0342262 | A1 | 11/2017 | Choi et al. |
| 2021/0171765 | A1* | 6/2021 | Wandner .................. C08K 7/14 |
| 2021/0253789 | A1* | 8/2021 | Kitagawa ............... C08G 64/04 |

FOREIGN PATENT DOCUMENTS

| | | | |
|---|---|---|---|
| CN | 101367990 A | | 2/2009 |
| CN | 104004328 A | | 8/2014 |
| CN | 105038181 | * | 11/2015 |
| CN | 107109044 A | | 8/2017 |
| JP | 08-067816 A | | 3/1996 |
| JP | 2004-211069 A | | 7/2004 |
| JP | 2005-054033 A | | 3/2005 |
| JP | 2012-533645 A | | 12/2012 |
| KR | 10-0244882 B1 | | 3/2000 |
| KR | 10-2014-0104714 A | | 8/2014 |
| WO | 2020/197132 A1 | | 10/2020 |

OTHER PUBLICATIONS

International Search Report in counterpart International Application No. PCT/KR2020/003403 dated Jun. 24, 2020, pp. 1-6.

* cited by examiner

*Primary Examiner* — David J Buttner
(74) *Attorney, Agent, or Firm* — Addition, Pendleton & Witherspoon, P.A.

(57) ABSTRACT

A thermoplastic resin composition according to the present invention contains about 100 parts by weight of a polycarbonate resin, about 5 to about 50 parts by weight of a polyolefin resin, about 5 to about 50 parts by weight of a glass fiber, and about 1 to about 20 parts by weight of a modified olefin-based copolymer, wherein the modified olefin-based copolymer includes an epoxy-modified olefin-based copolymer and a maleic acid anhydride-modified olefin-based copolymer, and the weight ratio of the epoxy-modified olefin-based copolymer to the maleic acid anhydride-modified olefin-based copolymer is about 1:0.05 to about 1:15. The thermoplastic resin composition has excellent stiffness, impact resistance, and the like, and has a low specific gravity, dielectric constant, dielectric dissipation factor, and the like.

11 Claims, No Drawings

THERMOPLASTIC POLYCARBONATE RESIN COMPOSITION AND MOLDED ARTICLE FORMED THEREFROM

CROSS-REFERENCE TO RELATED APPLICATIONS

This application claims priority to and the benefit of International Application No. PCT/KR2020/003403, filed Mar. 11, 2020, which published as WO 2020/197132 on Oct. 1, 2020, and Korean Patent Application No. 10-2019-0035582, filed in the Korean Intellectual Property Office on Mar. 28, 2019, the entire disclosure of each of which is incorporated herein by reference.

TECHNICAL FIELD

The present invention relates to a thermoplastic resin composition and a molded article formed of the same. More particularly, the present invention relates to a thermoplastic resin composition having good stiffness, impact resistance and having low specific gravity, permittivity, dielectric loss tangent, and a molded article formed of the same.

BACKGROUND ART

A thermoplastic resin including a polycarbonate resin and the like has low specific gravity compared to glass and metal, and has good properties in terms of moldability and impact resistance, so it is useful for housings of electric/electronic products, interior/exterior materials for automobiles, and exterior materials for buildings.

However, when such a thermoplastic resin composition is used for a housing of a mobile phone, there is a problem that communication performance is deteriorated due to its high permittivity. Recently, with a development of telecommunication networks, a frequency domain has been changed to an (ultra) high frequency band, so it is necessary to use a material having low permittivity and low dielectric loss tangent as a housing material for mobile phones.

Therefore, there is a need for a thermoplastic resin composition which has good properties in terms of stiffness, impact resistance, and has low specific gravity, permittivity, dielectric loss tangent.

The background technique of the present invention is disclosed in Japanese Patent Publication No. 2012-533645.

DISCLOSURE

Technical Problem

It is one object of the present invention to provide a thermoplastic resin composition having good stiffness, impact resistance and the like and having low specific gravity, permittivity, dielectric loss tangent.

It is another object of the present invention to provide a molded article formed of the thermoplastic resin composition.

The above and other objects of the present invention can be achieved by the present invention described below.

Technical Solution

1. One aspect of the present invention relates to a thermoplastic resin composition. The thermoplastic resin composition comprises about 5 to about 50 parts by weight of a polyolefin resin; about 5 to about 50 parts by weight of a glass fiber; and about 1 to about 20 parts by weight of a modified olefin copolymer; wherein the modified olefin copolymer comprises an epoxy modified olefin copolymer and a maleic anhydride modified olefin copolymer, the epoxy modified olefin copolymer and the maleic anhydride modified olefin copolymer are present in a weight ratio of about 1:0.05 to about 1:15.

2. In Embodiment 1, the polyolefin resin may include at least one of polypropylene, polyethylene and propylene-ethylene copolymer.

3. In Embodiments 1 to 2, the epoxy modified olefin copolymer may comprise an epoxy modified alkylene-alkyl (meth)acrylate copolymer in which an epoxy compound is copolymerized with an olefin-based copolymer obtained by copolymerization of alkylene monomer and alkyl(meth)acrylate monomer.

4. In Embodiments 1 to 3, the epoxy compound may include at least one of glycidyl (meth)acrylate, allylglycidyl ether, and 2-methylallylglycidyl ether.

5. In Embodiments 1 to 4, the epoxy modified olefin copolymer may include at least one of glycidyl (meth)acrylate modified ethylene-butyl acrylate copolymer, glycidyl (meth)acrylate modified ethylene-methyl acrylate copolymer and glycidyl (meth)acrylate modified ethylene-ethyl acrylate copolymer.

6. In Embodiments 1 to 5, the maleic anhydride modified olefin copolymer may comprise a maleic anhydride modified alkylene-α-olefin copolymer obtained by graft copolymerization of maleic anhydride to an alkylene-α-olefin copolymer.

7. In Embodiments 1 to 6, the maleic anhydride modified olefin copolymer may comprise at least one of a maleic anhydride modified ethylene-butene copolymer, a maleic anhydride modified ethylene-octene copolymer.

8. In Embodiments 1 to 7, the thermoplastic resin composition may have a flexural modulus of about 28,000 kgf/cm$^2$ to about 50,000 kgf/cm$^2$, as measured on a ¼" thick specimen at a rate of 2.8 mm/min in accordance with ASTM D790.

9. In Embodiments 1 to 8, the thermoplastic resin composition may have a notched Izod impact strength of about 10 kgf·cm/cm to about 20 kgf·cm/cm, as measured on a ⅛" thick specimen in accordance with ASTM D256.

10. In Embodiments 1 to 9, the thermoplastic resin composition may have a specific gravity of about 1.10 to about 1.27, as measured on a ⅛" thick specimen in accordance with ASTM D792.

11. In Embodiments 1 to 10, the thermoplastic resin composition may have a permittivity of about 2.5 to about 3.0, as measured on a specimen with a size of 2.5 mm×50 mm×90 mm in accordance with a split post dielectric resonator (SPDR) method at a frequency of 3.1 GHz.

12. In Embodiments 1 to 11, the thermoplastic resin composition may have a dielectric loss tangent of about 0.005 to about 0.020, as measured on a specimen with a size of 2.5 mm×50 mm×90 mm in accordance with a split post dielectric resonator (SPDR) method at a frequency of 3.1 GHz.

13. Another aspect of the present invention relates to a molded article. The molded article may be formed of the thermoplastic resin composition according to any one of Embodiments 1 to 12.

Advantageous Effects

The present invention provides a thermoplastic resin composition having good properties in terms of stiffness, impact resistance and having low specific gravity, permittivity and dielectric loss tangent, and a molded article formed of the same.

BEST MODE

Hereinafter, embodiments of the present invention will be described in detail.

A thermoplastic resin composition according to the present invention comprises (A) a polycarbonate resin; (B) a polyolefin resin; (C) a glass fiber; and (D) a modified olefin copolymer.

As used herein to represent a specific numerical range, the expression "a to b" means "≥a and ≤b".

(A) Polycarbonate Resin

The polycarbonate resin according to embodiments of the present invention may be a polycarbonate resin used in typical thermoplastic resin compositions. For example, the polycarbonate resin may be an aromatic polycarbonate resin obtained by reacting a precursor, such as phosgene, halogen formate, and carbonic diester, with diphenols (aromatic diol compounds).

Examples of the diphenols may include 4,4'-biphenol, 2,2-bis(4-hydroxyphenyl)propane, 2,4-bis(4-hydroxyphenyl)-2-methylbutene, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, without being limited thereto. For example, the diphenols may include 2,2-bis(4-hydroxyphenyl)propane, 2,2-bis(3,5-dichloro-4-hydroxyphenyl)propane, or 1,1-bis(4-hydroxyphenyl)cyclohexane, for example 2,2-bis-(4-hydroxyphenyl)propane, which is also referred to as bisphenol A.

In some embodiments, the polycarbonate resin may be a branched polycarbonate resin. For example, the polycarbonate resin may be a branched polycarbonate resin obtained by adding about 0.05 mol % to about 2 mol % of a tri- or higher polyfunctional compound, for example, a tri- or higher valent phenol group-containing compound, based on the total number of moles of the diphenols used in polymerization.

In some embodiments, the polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 15,000 g/mol to about 40,000 g/mol, as measured by a gel permeation chromatography (GPC). Within this range, the thermoplastic resin composition can have good fluidity (processability), and the like.

In some embodiments, the polycarbonate resin may have a melt-flow index (MI) of about 5 g/10 min to about 110 g/10 min, as measured under conditions of 300° C. and a load of 1.2 kgf in accordance with ISO 1133. In addition, the polycarbonate resin may be a mixture of two or more polycarbonate resins having different melt-flow indices.

(B) Polyolefin Resin

The polyolefin resin according to embodiments of the present invention may serve to improve fluidity and chemical resistance of the thermoplastic resin composition while imparting low specific gravity, low permittivity and dielectric loss tangent to the thermoplastic resin composition, and any commercially available polyolefin resin can be used. Examples of the polyolefin resin may include polyethylene-based resins including polyethylenes such as low-density polyethylene (LDPE), medium-density polyethylene (MDPE), high-density polyethylene (HDPE), and linear low-density polyethylene (LLDPE), ethylene-vinyl acetate copolymer (EVA), ethylene-acrylate copolymer, or mixtures thereof; polypropylene-based resins such as polypropylene, propylene-ethylene copolymer, propylene-1-butene copolymer, or mixtures thereof cross-linked polymers thereof; blends thereof with polyisobutene; or combinations thereof. In an embodiment, polypropylene, polyethylene, propylene-ethylene copolymer, combinations thereof can be used.

In some embodiments, the polyolefin resin may have a melt-flow index of about 1 g/10 min to about 50 g/10 min, for example, about 5 g/10 min to about 30 g/10 min, as measured under conditions of 230° C. and a load of 2.16 kg in accordance with ASTM D1238. Within this range, the thermoplastic resin composition may have good mechanical strength, molding processability, while lowering permittivity and dielectric loss tangent.

In some embodiments, the polyolefin resin may be present in an amount of about 5 parts by weight to about 50 parts by weight, for example, about 10 parts by weight to about 45 parts by weight, relative to about 100 parts by weight of the polycarbonate resin. If the amount of the polyolefin resin is less than about 5 parts by weight relative to about 100 parts by weight of the polycarbonate resin, the thermoplastic resin composition may have increased permittivity and dielectric loss tangent, and if the amount of the polyolefin resin exceeds about 50 parts by weight, the thermoplastic resin composition can suffer from deterioration in impact resistance and stiffness, and the like.

(C) Glass Fiber

According to the present invention, the glass fibers may improve mechanical properties including stiffness and the like of the thermoplastic resin composition, and may include glass fibers used for typical thermoplastic resin compositions.

In some embodiments, the glass fibers may have a fibrous shape and may have various cross-sectional shapes, such as a circular shape, an elliptical shape, a rectangular shape, and the like. For example, it is desirable in terms of mechanical properties to use fibrous glass fibers having circular and/or rectangular cross-sectional shapes.

In some embodiments, the glass fibers having a circular cross-sectional shape may have a diameter of about 5 μm to about 20 μm and a pre-process length of about 2 mm to about 20 mm, and the glass fibers having a rectangular cross-sectional shape may have an aspect ratio (major diameter/minor diameter of the cross-section) of about 1.5 to about 10, a minor diameter of about 2 μm to about 10 μm, and a pre-process length of about 2 mm to about 20 mm. Within this range, the thermoplastic resin composition can have improved properties in terms of stiffness, processability, and the like.

In some embodiments, the glass fibers may be subjected to surface treatment using a typical surface treatment agent.

In some embodiments, the glass fibers may be present in an amount of about 5 to about 50 parts by weight, for example, about 10 to about 40 parts by weight, relative to about 100 parts by weight of the polycarbonate resin. If the amount of the glass fibers is less than about 5 parts by weight, the thermoplastic resin composition can suffer from deterioration in stiffness, and the like, and if the amount of the glass fibers exceeds about 50 parts by weight, the thermoplastic resin composition can suffer from deterioration in processability, external appearance, and the like and may not achieve low specific gravity.

(D) Modified Olefin Copolymer

The modified olefin copolymer may serve to improve impact resistance and stiffness and to decrease permittivity, dielectric loss tangent of the thermoplastic resin composition, when it is applied with the polyolefin resin. The modified olefin copolymer may include (D1) epoxy modified olefin copolymer and (D2) maleic anhydride modified olefin copolymer.

(D1) Epoxy Modified Olefin Copolymer

According to one embodiment of the invention, the epoxy modified olefin copolymer is a reactive type olefin copolymer obtained by copolymerization of epoxy compound, which is a reactive functional group, with an olefin copolymer, and can improve impact resistance and stiffness of the thermoplastic resin composition together with a maleic anhydride modified olefin copolymer.

In some embodiments, the epoxy compound may include glycidyl (meth)acrylate, allylglycidyl ether, 2-methylallylglycidyl ether and mixtures thereof.

In some embodiments, the epoxy modified olefin copolymer may be obtained by copolymerization of the epoxy compound and an olefin-based copolymer which is obtained by copolymerization of alkylene monomer and alkyl(meth)acrylate monomer. The alkylene monomer may be a C2 to C10 alkylene, for example, ethylene, propylene, isopropylene, butylene, isobutylene, octene, and combinations thereof. The alkyl(meth)acrylate monomer may be a C1 to C8 alkyl(meth)acrylate, for example, methyl acrylate, ethyl acrylate, n-propyl acrylate, n-butyl acrylate, 2-ethylhexyl acrylate, methyl methacrylate, ethyl methacrylate, n-propyl methacrylate, n-butyl methacrylate, 2-ethylhexyl methacrylate, and combinations thereof.

In some embodiments, the epoxy modified olefin copolymer may include a glycidyl (meth)acrylate modified ethylene-butyl acrylate copolymer.

In some embodiments, the epoxy modified olefin copolymer may have a melt-flow index of about 1 g/10 min to about 50 g/10 min, for example, about 2 g/10 min to about 25 g/10 min, as measured under conditions of 190° C. and 2.16 kg in accordance with ASTM D1238.

(D2) Maleic Anhydride Modified Olefin Copolymer

According to one embodiment of the invention, the maleic anhydride modified olefin copolymer is a reactive type olefin copolymer obtained by graft copolymerization of maleic anhydride, which is a reactive functional group, to an olefin copolymer, and can improve impact resistance and chemical resistance of the thermoplastic resin composition together with an epoxy modified olefin copolymer.

In some embodiments, the maleic anhydride modified olefin copolymer may be obtained by graft copolymerization of maleic anhydride to an olefin copolymer obtained by copolymerization of at least two alkylene monomers. The alkylene monomer may be a C2 to C10 alkylene, for example, ethylene, propylene, isopropylene, butylene, isobutylene, octene, and combinations thereof.

In some embodiments, the maleic anhydride modified olefin copolymer may include a maleic anhydride modified alkylene-α-olefin copolymer obtained by graft copolymerization of maleic anhydride to an alkylene-α-olefin copolymer.

In some embodiments, the maleic anhydride modified olefin copolymer may include a maleic anhydride modified ethylene-butene copolymer.

In some embodiments, the maleic anhydride modified olefin copolymer may have a melt-flow index of about 0.5/10 min to about 20 g/10 min, for example, about 1/10 min to about 10 g/10 min, as measured under conditions of 190° C. and 2.16 kg in accordance with ASTM D1238.

In some embodiments, the modified olefin copolymer (D) may be present in an amount of about 1 to about 20 parts by weight, for example, about 5 to about 15 parts by weight, relative to about 100 parts by weight of the polycarbonate resin. If the amount of the modified olefin copolymer is less than about 1 part by weight, relative to about 100 parts by weight of the polycarbonate resin, the thermoplastic resin composition cannot achieve low specific gravity, permittivity and dielectric loss tangent, and if the amount of the modified olefin copolymer exceeds about 20 parts by weight, the thermoplastic resin composition can suffer from deterioration in impact resistance, stiffness, and the like. Here, the epoxy modified olefin copolymer (D1) may be present in an amount of about 0.2 to about 10 parts by weight, for example, about 0.5 to about 8 parts by weight, relative to about 100 parts by weight of the polycarbonate resin. The maleic anhydride modified olefin copolymer (D2) may be present in an amount of about 0.2 to about 10 parts by weight, for example, about 0.5 to about 8 parts by weight, relative to about 100 parts by weight of the polycarbonate resin.

In some embodiments, the epoxy modified olefin copolymer (D1) and the maleic anhydride modified olefin copolymer (D2) may be present in a weight ratio (D1:D2) of about 1:0.05 to about 1:15, for example, about 1:0.1 to about 1:10. If the weight ratio (D1:D2) is less than about 1:0.05 or exceeds about 1:15, the thermoplastic resin composition can suffer from deterioration in impact resistance, stiffness and the like.

In some embodiments, the polyolefin resin (B) and the modified olefin copolymer (D) may be present in a weight ratio (B:D) of about 1:0.5 to about 1:1, for example, about 1:0.1 to about 1:0.7. Within this range, the thermoplastic resin composition can have good properties in terms of impact resistance, stiffness and the like, and can have low permittivity and dielectric loss tangent.

In some embodiments, the glass fiber (C) and the modified olefin copolymer (D) may be present in a weight ratio (C:D) of about 1:0.1 to about 1:0.7, for example, about 1:0.2 to about 1:0.5. Within this range, the thermoplastic resin composition can have better impact resistance, stiffness and the like.

In one embodiment, the thermoplastic resin composition may further include any typical additive included in thermoplastic resin compositions. Examples of the additive may include a flame retardant, an antioxidant, an anti-dripping agent, a lubricant, a release agent, a nucleating agent, an antistatic agent, a stabilizer, pigments, dyes, and mixtures thereof, without being limited thereto. The additives may be present in an amount of about 0.001 to about 40 parts by weight, for example, about 0.1 to about 10 parts by weight, relative to about 100 parts by weight of a polycarbonate resin.

According to one embodiment of the invention, the thermoplastic resin composition may be prepared in pellet form by mixing the aforementioned components, followed by melt extrusion using a typical twin-screw extruder at about 200° C. to about 280° C., for example, about 220° C. to about 260° C.

In some embodiments, the thermoplastic resin composition may have a flexural modulus about 28,000 kgf/cm$^2$ to about 50,000 kgf/cm$^2$, for example, about 30,000 kgf/cm$^2$ to about 45,000 kgf/cm$^2$, as measured on a ¼" thick specimen at a rate of 2.8 mm/min in accordance with ASTM D790.

In some embodiments, the thermoplastic resin composition may have a Notched Izod impact strength of about 10 kgf·cm/cm to about 20 kgf·cm/cm, for example, about 10 kgf·cm/cm to about 18 kgf·cm/cm as measured on a ⅛" thick specimen in accordance with ASTM D256.

In some embodiments, the thermoplastic resin composition may have a specific gravity of about 1.10 to about 1.27, for example, about 1.10 to about 1.25, as measured on a ⅛" thick specimen in accordance with ASTM D792.

In some embodiments, the thermoplastic resin composition may have a permittivity of about 2.5 to about 3.0, for example, about 2.7 to about 3.0, as measured on a specimen with a size of 2.5 mm×50 mm×90 mm in accordance with a split post dielectric resonator (SPDR) method at a frequency of 3.1 GHz.

In some embodiments, the thermoplastic resin composition may have a dielectric loss tangent of about 0.005 to about 0.020, for example, about 0.010 to about 0.020, as measured on a specimen with a size of 2.5 mm×50 mm×90 mm in accordance with a split post dielectric resonator (SPDR) method at a frequency of 3.1 GHz.

A molded article according to the present invention is formed of the thermoplastic resin composition set forth above. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles may exhibit good properties in terms of stiffness, impact resistance and may have low specific gravity, permittivity, and dielectric loss tangent, and thus may be useful as a housing for electric and electronic products and a housing for portable devices such as smartphones.

MODE FOR INVENTION

Next, the present invention will be described in more detail with reference to some examples. It should be understood that these examples are provided for illustration only and are not to be in any way construed as limiting the present invention.

EXAMPLES

Details of components used in Examples and Comparative Examples are as follows:

(A) Polycarbonate Resin

A bisphenol-A polycarbonate resin (weight average molecular weight: 22,000 g/mol) was used.

(B) Polyolefin Resin

A polypropylene resin (Manufacturer: Lotte Chemical Corp.) having a melt-flow index (MI) of 12 g/10 min, as measured under conditions of 230° C. and a load of 2.16 kg in accordance with ASTM D1238, was used.

(C) Glass Fiber

Glass fibers (Manufacturer: Nitto Boseki) having a rectangular cross-section with an aspect ratio (major diameter/minor diameter of the cross-section) of 4, a minor diameter of the cross-section of 7 μm and a pre-process length of 3 mm was used.

(D) Modified Olefin Copolymer (D1) Epoxy Modified Olefin Copolymer

A glycidyl methacrylate modified ethylene-butyl acrylate copolymer (Manufacturer: DuPont) was used.

(D2) Maleic Anhydride Modified Olefin Copolymer

A maleic anhydride modified ethylene-butene copolymer (Manufacturer: Mitsui Chemicals) was used.

(D3) Ethylene-Methyl Acrylate Copolymer (Manufacturer: DuPont, Product Name: Elvaroy AC 1224) was Used.

Examples 1 to 6 and Comparative Examples 1 to 9

The aforementioned components were mixed in amounts as listed in Tables 1 and 2, followed by extrusion at 260° C., thereby preparing a thermoplastic resin composition in pellet form. Here, extrusion was performed using a twin-screw extruder (L/D: 44, Φ: 45 mm). The prepared pellets were dried at 80° C. for 4 hours or more and then subjected to injection molding using a 6 oz. injection machine (molding temperature: 280° C., mold temperature: 70° C.), thereby preparing a specimen. The prepared specimen was evaluated as to the following properties. Results are shown in Tables 1 and 2.

Property Evaluation (1) Flexural modulus (unit: kgf/cm$^2$):) Flexural modulus was measured on a ¼" thick specimen at a rate of 2.8 mm/min in accordance with ASTM D790.

(2) Notched Izod impact strength (unit: kgf·cm/cm): Notched Izod impact strength was measured on a ⅛" thick Izod specimen in accordance with ASTM D256.

(3) Specific gravity: Specific gravity was measured on a ⅛" thick specimen in accordance with ASTM D792.

(4) Permittivity: Permittivity was measured on a specimen with a size of 2.5 mm×50 mm×90 mm in accordance with a split post dielectric resonator (SPDR) method using an instrument (DAK3.5-TL-P (200 MHz-20 GHz with DAK1.2E-PL probe) at a frequency of 3.1 GHz.

(5) Dielectric loss tangent: Dielectric loss tangent was measured on a specimen with a size of 2.5 mm×50 mm×90 mm in accordance with a split post dielectric resonator (SPDR) method using an instrument (DAK3.5-TL-P (200 MHz-20 GHz with DAK1.2E-PL probe) at a frequency of 3.1 GHz.

TABLE 1

|  | Example | | | | | |
| --- | --- | --- | --- | --- | --- | --- |
|  | 1 | 2 | 3 | 4 | 5 | 6 |
| (A) (parts by weight) | 100 | 100 | 100 | 100 | 100 | 100 |
| (B) (parts by weight) | 11.1 | 25.0 | 42.9 | 25.0 | 25.0 | 42.9 |
| (C) (parts by weight) | 12.3 | 13.9 | 15.9 | 13.9 | 13.9 | 35.7 |
| (D1) (parts by weight) | 2.5 | 2.8 | 3.2 | 0.7 | 6.3 | 3.6 |
| (D2) (parts by weight) | 3.7 | 4.2 | 4.8 | 6.3 | 0.7 | 5.4 |
| (D3) (parts by weight) | — | — | — | — | — | — |
| Flexural Modulus | 30,900 | 30,200 | 30,500 | 30,500 | 30,600 | 41,300 |
| Notched Izod Impact Strength | 18.0 | 15.0 | 12.2 | 14.5 | 17.5 | 11.3 |

TABLE 1-continued

|  | Example | | | | | |
|---|---|---|---|---|---|---|
|  | 1 | 2 | 3 | 4 | 5 | 6 |
| Specific Gravity | 1.19 | 1.17 | 1.14 | 1.17 | 1.17 | 1.25 |
| Permittivity | 2.85 | 2.79 | 2.73 | 2.79 | 2.78 | 2.91 |
| Dielectric Loss Tangent | 0.015 | 0.013 | 0.011 | 0.013 | 0.013 | 0.017 |

TABLE 2

|  | Comparative Example | | | | | | | | |
|---|---|---|---|---|---|---|---|---|---|
|  | 1 | 2 | 3 | 4 | 5 | 6 | 7 | 8 | 9 |
| (A) (parts by weight) | 100 | 100 | 100 | 100 | 100 | 100 | 100 | 100 | 100 |
| (B) (parts by weight) | 4.7 | 52.5 | 25.0 | 25.0 | 25.0 | 25.0 | 25.0 | 25.0 | 25.0 |
| (C) (parts by weight) | 11.6 | 16.9 | 13.9 | 13.9 | 13.9 | 13.9 | 13.9 | 13.9 | 13.9 |
| (D1) (parts by weight) | 2.3 | 3.4 | 0.1 | 11.1 | 10.0 | — | — | 4.2 | — |
| (D2) (parts by weight) | 3.5 | 5.1 | 11.1 | 0.1 | — | 10.0 | — | — | 4.2 |
| (D3) (parts by weight) | — | — | — | — | — | — | 10.0 | 2.8 | 2.8 |
| Flexural Modulus | 32,000 | 27,500 | 27,000 | 26,700 | 27,200 | 27,100 | 29,400 | 30,200 | 30,500 |
| Notched Izod Impact Strength | 18.5 | 8.0 | 8.5 | 8.2 | 9.2 | 8.9 | 8.2 | 8.5 | 9.8 |
| Specific Gravity | 1.28 | 1.01 | 1.17 | 1.17 | 1.17 | 1.17 | 1.17 | 1.17 | 1.17 |
| Permittivity | 3.05 | 2.79 | 2.79 | 2.79 | 2.79 | 2.79 | 2.79 | 2.79 | 2.79 |
| Dielectric Loss Tangent | 0.024 | 0.013 | 0.013 | 0.013 | 0.013 | 0.013 | 0.013 | 0.013 | 0.013 |

From the above results, it can be seen that the thermoplastic resin composition according to the present invention had good properties in terms of stiffness (flexural modulus), impact resistance (Notched Izod impact strength) and had low specific gravity, permittivity, dielectric loss tangent.

In contrast, it could be seen that the composition of Comparative Example 1 prepared using a small amount of the polyolefin resin suffered increased permittivity, dielectric loss tangent and specific gravity; the composition of Comparative Example 2 prepared using an excess of the polyolefin resin suffered from deterioration in impact resistance, stiffness and the like; the compositions of Comparative Examples 3 and 4, in which a weight ratio of the epoxy modified olefin copolymer and the maleic anhydride modified olefin copolymer were outside the range of the present invention, suffered from deterioration in impact resistance, stiffness and the like; the composition of Comparative Example 5 prepared using the epoxy modified olefin copolymer only as a modified olefin copolymer or the composition of Comparative Example 6 prepared using the maleic anhydride modified olefin copolymer only as a modified olefin copolymer suffered from deterioration in impact resistance, stiffness and the like; the composition of Comparative Example 7 prepared using an ethylene-methyl acrylate copolymer (D3) instead of the modified olefin copolymer suffered from deterioration in impact resistance and the like; Further, the composition of Comparative Example 8 prepared using the epoxy modified olefin copolymer and an ethylene-methyl acrylate copolymer (D3) instead of the maleic anhydride modified olefin copolymer and the composition of Comparative Example 9 prepared using the maleic anhydride modified olefin copolymer and an ethylene-methyl acrylate copolymer (D3) instead of the epoxy modified olefin copolymer suffered from deterioration in impact resistance and the like.

It should be understood that various modifications, changes, alterations, and equivalent embodiments can be made by those skilled in the art without departing from the spirit and scope of the invention.

The invention claimed is:

1. A thermoplastic resin composition comprising:
    about 100 parts by weight of a polycarbonate resin;
    about 5 to about 50 parts by weight of a polyolefin resin;
    about 5 to about 50 parts by weight of a glass fiber; and
    about 1 to about 20 parts by weight of modified olefin copolymers;
    wherein the modified olefin copolymers comprise an epoxy modified olefin copolymer and a maleic anhydride modified olefin copolymer, the epoxy modified olefin copolymer and the maleic anhydride modified olefin copolymer are present in a weight ratio of about 1:0.05 to about 1:15,
    wherein the epoxy modified olefin copolymer comprises an epoxy modified alkylene-alkyl(meth)acrylate copolymer in which an epoxy compound is copolymerized with an olefin-based copolymer obtained by copolymerization of alkylene monomer and alkyl(meth)acrylate monomer, and
    wherein the maleic anhydride modified olefin copolymer comprises a maleic anhydride modified alkylene-α-olefin copolymer obtained by graft copolymerization of maleic anhydride to an alkylene-α-olefin copolymer.

2. The thermoplastic resin composition according to claim 1, wherein the polyolefin resin includes polypropylene, polyethylene and/or propylene-ethylene copolymer.

3. The thermoplastic resin composition according to claim 1, wherein the epoxy compound includes glycidyl (meth) acrylate, allylglycidyl ether, and/or 2-methylallylglycidyl ether.

4. The thermoplastic resin composition according to claim 1, wherein the epoxy modified olefin copolymer includes glycidyl (meth)acrylate modified ethylene-butyl acrylate copolymer, glycidyl (meth)acrylate modified ethylene-methyl acrylate copolymer and/or glycidyl (meth)acrylate modified ethylene-ethyl acrylate copolymer.

5. The thermoplastic resin composition according to claim 1, wherein the maleic anhydride modified olefin copolymer comprises a maleic anhydride modified ethylene-butene copolymer and/or a maleic anhydride modified ethylene-octene copolymer.

6. The thermoplastic resin composition according to claim 1, wherein the thermoplastic resin composition has a flexural modulus of about 28,000 kgf/cm² to about 50,000 kgf/cm², as measured on a ¼" thick specimen at a rate of 2.8 mm/min in accordance with ASTM D790.

7. The thermoplastic resin composition according to claim 1, wherein the thermoplastic resin composition has a notched Izod impact strength of about 10 kgf·cm/cm to about 20 kgf·cm/cm, as measured on a ⅛" thick specimen in accordance with ASTM D256.

8. The thermoplastic resin composition according to claim 1, wherein the thermoplastic resin composition has a specific gravity of about 1.10 to about 1.27, as measured on a ⅛" thick specimen in accordance with ASTM D792.

9. The thermoplastic resin composition according to claim 1, wherein the thermoplastic resin composition has a permittivity of about 2.5 to about 3.0, as measured on a specimen with a size of 2.5 mm×50 mm×90 mm in accordance with a split post dielectric resonator (SPDR) method at a frequency of 3.1 GHz.

10. The thermoplastic resin composition according to claim 1, wherein the thermoplastic resin composition has a dielectric loss tangent of about 0.005 to about 0.020, as measured on a specimen with a size of 2.5 mm×50 mm×90 mm in accordance with a split post dielectric resonator (SPDR) method at a frequency of 3.1 GHz.

11. A molded article formed of the thermoplastic resin composition according to claim 1.

* * * * *